United States Patent
Marton et al.

(10) Patent No.: US 8,259,959 B2
(45) Date of Patent: Sep. 4, 2012

(54) TOROID MICROPHONE APPARATUS

(75) Inventors: Trygve Frederik Marton, Oslo (NO); Lennart Burenius, Göteborg (SE)

(73) Assignee: Cisco Technology, Inc., San Jose, CA (US)

( * ) Notice: Subject to any disclaimer, the term of this patent is extended or adjusted under 35 U.S.C. 154(b) by 227 days.

(21) Appl. No.: 12/637,444

(22) Filed: Dec. 14, 2009

(65) Prior Publication Data
US 2010/0158268 A1    Jun. 24, 2010

Related U.S. Application Data

(60) Provisional application No. 61/140,307, filed on Dec. 23, 2008.

(51) Int. Cl.
*H04R 3/00* (2006.01)

(52) U.S. Cl. .................. 381/92; 381/356

(58) Field of Classification Search .......... 381/92, 381/122, 356, 111, 98, 103, 95, 120, 66, 381/83, 26
See application file for complete search history.

(56) References Cited

U.S. PATENT DOCUMENTS

| | | | | |
|---|---|---|---|---|
| 3,573,400 A | * | 4/1971 | Sessler et al. | 381/357 |
| 4,675,906 A | * | 6/1987 | Sessler et al. | 381/92 |
| 2010/0166219 A1 | * | 7/2010 | Marton | 381/98 |

OTHER PUBLICATIONS

U.S. Appl. No. 12/645,701, filed Dec. 23, 2009, Marton.
U.S. Appl. No. 12/691,509, filed Jan. 21, 2010, Marton.

* cited by examiner

*Primary Examiner* — Vivian Chin
*Assistant Examiner* — Con P Tran
(74) *Attorney, Agent, or Firm* — Oblon, Spivak, McClelland, Maier & Neustadt, L.L.P.

(57) ABSTRACT

A video teleconferencing directional microphone includes two microphone elements arranged coincidentally on a vertical axis. The two microphone elements are placed on a supporting surface so that a first microphone element is on the surface, and the second microphone elements are elevated above the supporting surface. The directional microphone also includes filters, an adder assembly, and an equalizer, which are used to shape the directivity pattern of the directional microphone into a toroid sensitivity pattern. The toroid sensitivity pattern increases sensitivity in the direction of a sound source of interest, while simultaneously reduces sensitivity to any sound waves generated by noise sources from certain elevation angles.

21 Claims, 10 Drawing Sheets

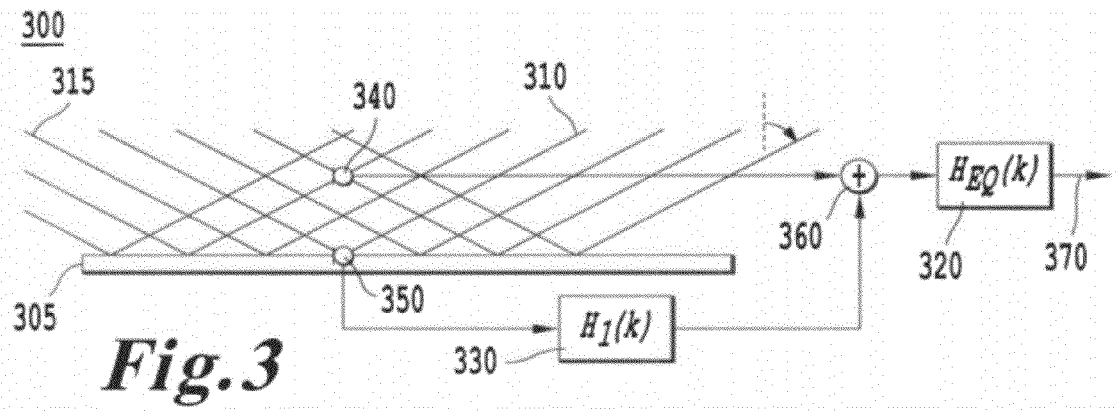
*Fig.3*
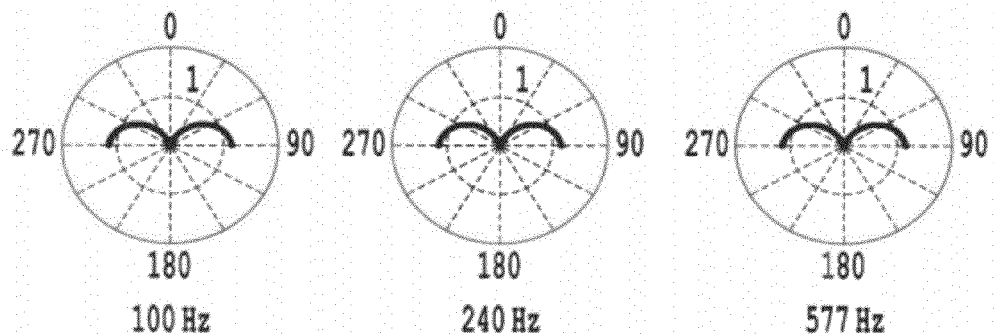
*Fig.5A*     *Fig.5B*     *Fig.5C*
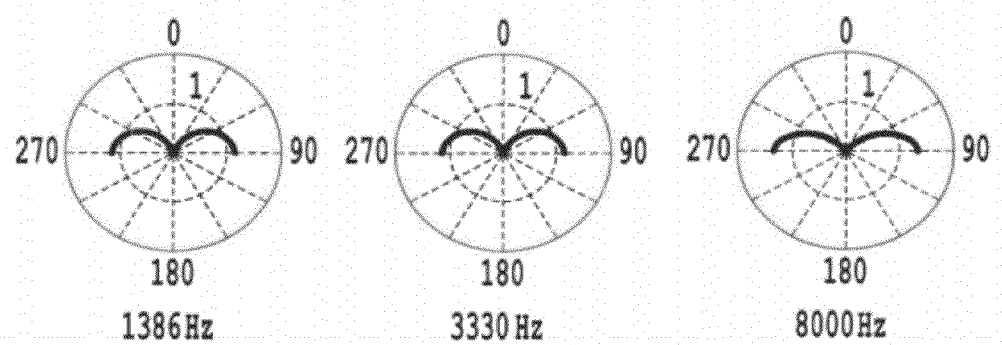
*Fig.5D*     *Fig.5E*     *Fig.5F*

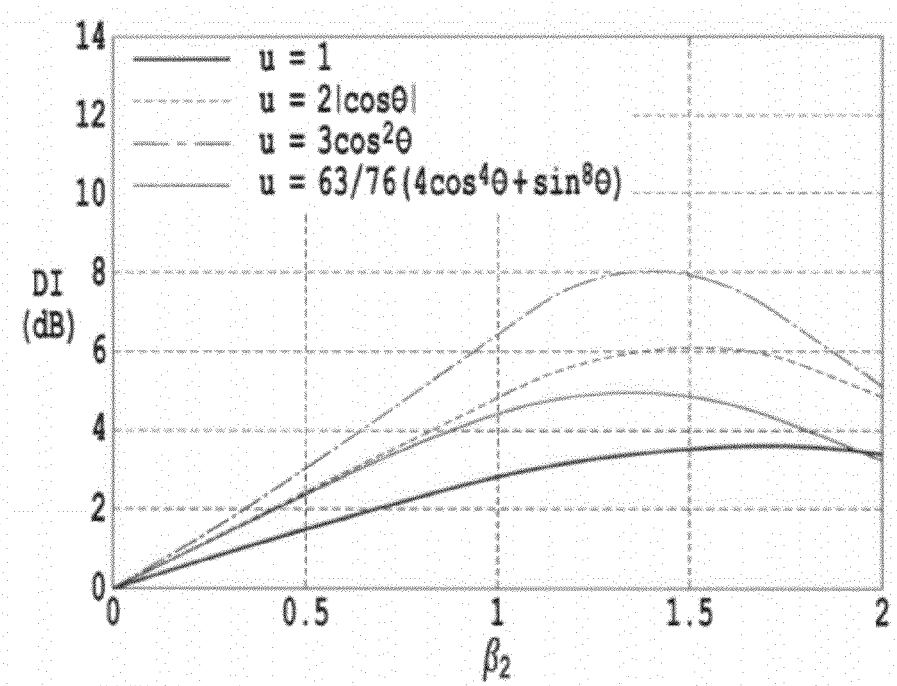
*Fig. 9A*  $\theta_0 = 90°$
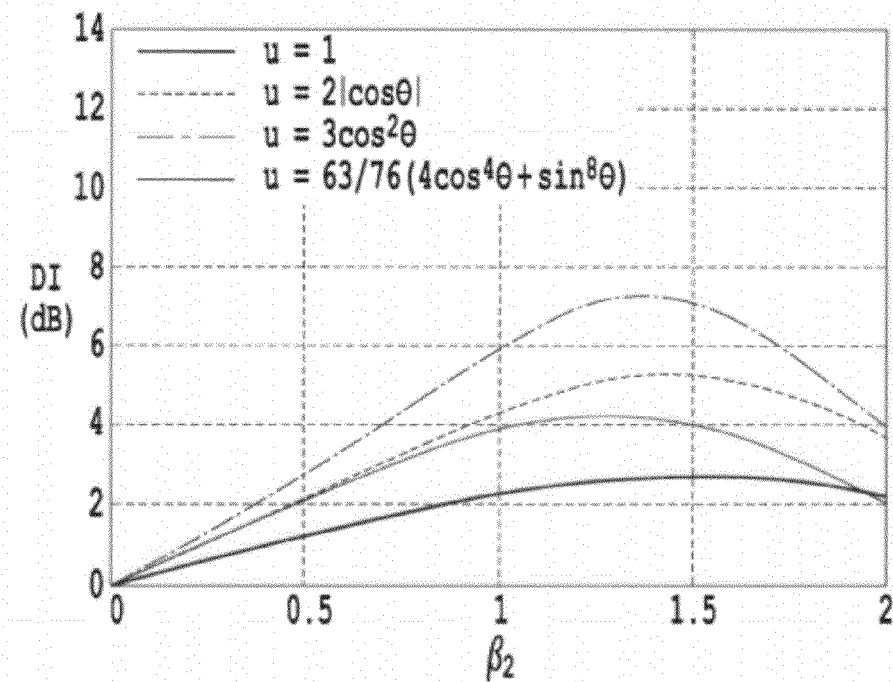
*Fig. 9B*  $\theta_0 = 70°$

TOROID MICROPHONE APPARATUS

CROSS-REFERENCE TO RELATED APPLICATIONS

The present application is related to U.S. Application Ser. No. 12/645,701 entitled "Elevated Toroid Microphone Apparatus" and filed on Dec. 23, 2009 and U.S. Provisional Application No. 61/140,307 entitled "Elevated Toroid Microphone Apparatus" and filed on Dec. 23, 2008. The entire contents of both applications are incorporated herein by reference.

BACKGROUND

A video teleconferencing system including a microphone having a sensitivity pattern independent of the microphone's azimuth angle is provided. Specifically, a microphone that maximizes sensitivity in the direction of a sound source of interest, and minimizes sensitivity to sound from other directions is described.

Video teleconferencing systems create virtual meetings between two or more parties that are separately located in, for example, different rooms. The rooms may be within a same building or in different buildings, and the different buildings can be located in different cities, countries, continents, etc. Thus, video teleconferencing systems create meetings that would otherwise require travel of potentially large distances.

To create virtual meetings, video teleconferencing systems transmit audio data along with video data, and thus include one or more microphones at each location to capture sound waves. The microphones convert sound waves generated in one video teleconferencing room into electrical impulses for transmission to another video teleconferencing room. Audio quality is therefore directly dependent on the positioning of the microphone within the room, the acoustics of the room, and particularly to the characteristics of the microphone itself.

For example, a conventional microphone used to capture sound from a sound source of interest, such as a person speaking, receives direct sound waves, reflected sound waves and reverberant sound waves from the source. Direct sound waves travel directly to the microphone without reflection, and are the sound waves intended to be captured by microphones. Direct sound wave levels are inversely proportional to the distance between the sound source of interest and the microphone receiving the sound.

Reflected sound waves do not travel directly to the microphone. Instead, they are reflected multiple times by objects in the room, or the room itself, before reaching the microphone. For example, sound waves from a sound source of interest may be reflected by walls, floors, ceilings, chairs, etc. Reflected sounds waves that propagate less than 50-80 ms (corresponding to a propagation distance of 17 to 27 meters) before reaching the microphone are known as "early reflections", and have pressure levels approximately equal to those of direct sound waves, but are delayed in time.

Early reflections from the sound source of interest may positively contribute to the audio received by the microphone. However, they may also distort the audio. The time delay causes a phase difference between the early reflections and the direct sound waves, which may result in cancellation of some of the frequency components of the direct sound waves. This phenomenon is known as "comb filtering", and has a negative impact on sound quality.

Reflections that propagate for more than 50 to 80 ms (17 to 27 meters) are known as "reverberant sound". Reverberant sound arrives at the microphone from nearly every direction because these sound waves have reflected many times within the room. Also, their pressure level is largely independent of microphone-sound-source distance. Unlike early reflections, reverberant sound always contributes negatively to audio quality by creating a "distant", "hollow", and/or "muffled" characteristic.

The level of distortion caused by reverberant sound is determined by a ratio of a level of direct sound to a level of reverberant sound. For example, if the sound source of interest is very close to the microphone the ratio of direct sound to reverberant sound is large, and distortion is small. As the sound source of interest moves away from the microphone the ratio of direct sound to reverberant sound will decrease, increasing distortion.

A distance at which the level of the direct sound equals the level of the reverberant sound is known as the "room radius", which can be determined for every room. As a sound source of interest moves outside of the room radius, reverberant sound dominates and distortion increases. Conversely, as the sound source moves within the room radius the direct sound dominates, and distortion decreases. Therefore, for conventional microphone systems, the sound source of interest should remain within the room radius to avoid significant audio distortion.

Moreover, direct sound, reflected sound, and reverberant sound are not limited to the sound source of interest, and may also be present for noise sources in a video teleconferencing room. Noise sources include, for example, fan noise from ventilation systems, cooling fan noise from electronic equipment (e.g. ceiling mounted projectors), noises from outside of the video teleconferencing room, sound from loudspeakers, moving chairs, and any other sound emitting from sources other than the sound source of interest. Conventional video teleconferencing system microphones receive direct, reflected and reverberant sound waves from these noise sources as well, further deteriorating audio quality.

In addition, each noise source has a different dominant component. For example, cooling fans installed on electrical equipment and noise originating outside of the video teleconferencing room primarily contributes noise in the form of reverberant sound waves, while ventilation systems contribute both direct and reverberant sound waves.

Conventional microphones also contribute noise in the form of an echo. An echo occurs when sound from a loudspeaker used to reproduce audio transmitted from remote parties to the video teleconference is captured by the microphone and retransmitted to the remote party. Echoes also have direct, reflected and reverberant sound components, but dominance of one component over the others is determined by a loudspeaker-to-microphone distance, which is not always constant.

Echoes are conventionally attenuated with echo cancellers, which are adaptive filters that adapt to a loudspeaker-microphone channel response. However, echo cancellers cannot prevent a microphone from receiving an echo. Instead, echo cancellers merely attenuate echoes already present in an audio signal.

Because of their adaptive nature, echo cancellers require time to adapt to a given response, making time-invariant loudspeaker-microphone channel responses desirable. In practice, however, microphones may be repositioned during a video teleconference in order to capture audio from several different sound sources, and time-invariant loudspeaker-to-microphone channels are difficult to achieve. Thus, a conventional video teleconferencing system's echo cancellers are typically required to adapt multiple times. Moreover, echo cancellers have difficulty attenuating reverberant sound components, resulting increased computational complexity as the level of reverberant echoes increase.

The issues described above are exacerbated when omni directional microphones are used in video teleconferencing systems. An omni directional microphone receives audio from all directions with equal sensitivity, and thus receives direct, reflected and reverberant sounds from every sound source within the room, including noise sources. In fact, only noise sources below a table on which the microphone is placed will be attenuated because the table functions as a barrier to sound pressure waves. Though omni directional microphones are capable of capturing audio from all sound sources of interest without being repositioned, the resulting audio quality is poor because of captured noise source sound.

One way to improve the quality of audio transmitted by a video teleconferencing system is to use directional microphones. Unlike omni directional microphones, a directional microphone has higher sensitivity with respect to certain directions over others, and inherently filters sound from at least some noise sources. This improves audio quality relative to an omni directional microphone, but also requires that a directional microphone be oriented to align its direction of highest sensitivity ("main axis") toward the sound source of interest. Therefore, the directional microphone requires repositioning every time the sound source of interest changes position.

Directional microphones having a cardioid sensitivity pattern or a bidirectional sensitivity pattern are typically used in video teleconferencing. A microphone having cardioid sensitivity has a directivity function given by:

$$g(\alpha) = \frac{1}{2} + \frac{1}{2}\cos(\alpha),$$

where $\alpha$ is the azimuth angle of a main axis with respect to horizontal. A typical cardioid microphone has a maximum sensitivity at $\alpha=0°$ and a minimum sensitivity at $\alpha=180°$.

A bidirectional microphone has a directivity function given by: $g(\alpha)=\cos(\alpha)$, where $\alpha$ is also the azimuth angle of a main axis with respect to horizontal. This microphone has a maximum sensitivity for $\alpha=0°$ and $\alpha=180°$, and a minimum sensitivity when $\alpha=90°$ and $\alpha=270°$. Because both the cardioid and bidirectional sensitivity patterns on the azimuth angle of the microphone, sensitivity for these microphones varies horizontally and vertically.

As in the case of an omni directional microphone, placing the cardioid or bidirectional microphone on a table improves audio quality because the table acts as a barrier to sound waves originating below the table surface, improving the direct to reverberant sound ratio.

Microphone sensitivity may also be improved by placing the microphone directly on the table-top surface to receive both direct sound and early reflections. The direct sound waves and early reflections reflected by the table remain in phase, and combine to form a pressure wave that is double that of the direct sound wave. This effectively increases the microphone sensitivity by six decibels compared to a microphone in a free field, and is referred to as the "boundary principle".

Directional microphones still have the drawback of requiring the sound source of interest to remain located near the main sensitivity direction of the microphone. Thus, when several people take part in a meeting, the microphone must be continually readjusted to avoid diminished audio quality as each person speaks. Therefore, cardioid and bidirectional microphones requires that people taking part in the video teleconference be aware of the sensitivity patterns of the microphone in order to make position adjustments, making these directional microphones difficult to use.

Some conventional microphone systems use several directional microphones to avoid microphone repositioning. For example, one conventional microphone uses four cardioid elements rotated at 90° relative to each other, and selects audio from the microphone element having a main axis closest to the active sound source of interest. Another conventional microphone system uses two bidirectional microphone elements placed at 90° relative to each other, and audio processing to create a virtual microphone sensitivity pattern. For example, if the physical bidirectional patterns of the two bidirectional microphones exist at main axes 0° and 90°, virtual patterns may be created in the range of 45° to 135°.

However, these conventional microphone systems create time-varying loudspeaker-microphone channel responses that increase the complexity of echo canceling, and force echo cancellers to adapt more frequently. Optimal echo cancellation may therefore be prevented by the frequent echo canceller adaptation. These conventional microphone systems also require more complex hardware, increasing a difficulty of installation.

To avoid increasing system complexity and difficult installations, fixed-sensitivity-pattern microphones are preferred in video teleconferencing systems. The omni directional microphone discussed above has a fixed sensitivity pattern, but lacks the ability to suppress reverberant sound. Directional microphones also have fixed sensitivity patterns and suppress reverberant sound, but require frequent repositioning.

A third conventional microphone that has a fixed sensitivity pattern is a toroidal microphone. A toroidal microphone's sensitivity pattern is in the shape of a toroid and is given by: $g(\theta)=\sin(\theta)$. One such conventional toroidal microphone may be constructed with two orthogonal, horizontally coincident bidirectional microphone elements whose output signals are added in quadrature phase. Alternatively, a second order toroidal microphone may be constructed to have a sensitivity pattern given by: $g(\theta)=\sin^2(\theta)$, from four orthogonal, horizontally coincident bidirectional microphones whose signals are added in phase. Alternatively, each bidirectional microphone can be constructed by subtracting two omni directional elements. One of the elements in each pair may be shared for all four pairs. For example, a second order toroidal microphone can be constructed using five omni directional microphones.

Because the sensitivity pattern of a toroidal microphone depends on the elevation angle of the microphone, not the azimuth, its sensitivity only varies in a vertical direction. Therefore, toroidal microphones may capture sound from sources at different positions throughout a room without the need for frequent repositioning. Using a microphone with toroidal, doughnut-shaped, directivity in teleconferencing was suggested by Sessler et. al during the 1960's [G. M. Sessler, J. E. West, and M. R. Schroeder, "Toroidal microphones," *The Journal of the Acoustical Society of America*, vol. 46, no. 1A, pp. 28-36, 1969]. A toroidal microphone can be placed above a round table to receive sound from all parties to the call with maximal and equal sensitivity, while attenuating the reverberant noise field and suppressing the acoustic echo path from the loudspeaker.

The above-described second order toroid is created using five omni directional microphones elements placed in a horizontal plane or, alternatively, by sampling the sound field with tubes. However, the implementation using tubes is difficult to balance acoustically and is limited by problems resulting from tube resonances. Another implementation using four bidirectional elements together with a plastic cylinder is also known. [G. M. Sessler and J. E. West, "A simple second-order toroid microphone," *Acustica*, vol. 57, no. 4-5, pp. 193-199, 1985]. However, this implementation also relies on a large number of microphone elements to create the toroid directivity pattern, and is plagued with phase and sensitivity matching problems among the microphone elements. Hence, conventional toroid microphones are large, costly and very difficult to implement.

SUMMARY

Therefore, as recognized by the present inventors, a need exists for a microphone having a sensitivity pattern that is independent of azimuth angle and maximizes sensitivity in the direction of sound sources of interest while minimizes sensitivity in the direction of noise sources. The microphone should also comprise as few microphone elements as possible to reduce cost and complexity.

A toroid microphone includes a first microphone element arranged adjacent to a reflecting surface, and a second microphone element arranged at a predetermined distance ($d_2$) above the first microphone element. A first filter is connected to the first microphone element and has a frequency response $H_1'(k)$, while a second filter is also connected to the first microphone element and has a frequency response $H_1''(k)$. A third filter is connected to the second microphone element and has a frequency response $H_2(k)$. An adder combines the outputs of the first, second and third microphone assemblies into an adder output by adding the outputs of the first and third filters and subtracting the output of the second filter. The frequency responses of the first, second and third filters combine to generate a toroid directivity pattern for the toroid microphone.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings. However, the accompanying drawings and their exemplary depictions do not in any way limit the scope of the inventions embraced by this specification. The scope of the inventions embraced by the specification and drawings are defined by the words of the accompanying claims.

FIG. 3 is a schematic drawing of a toroid microphone according to a first exemplary embodiment of the present disclosure;

FIGS. 5A-5F include six toroid sensitivity pattern graphs for six frequencies according to an exemplary embodiment of the present disclosure;

FIGS. 9A-9B are derivatively indexes based on parameter $\beta 2$ for a toroid microphone according to the second exemplary embodiment of the present disclosure;

DETAILED DESCRIPTION

In the following, the present advancement is discussed by describing preferred embodiments with reference to the accompanying drawings. However, those skilled in the art will recognize other applications and modifications within the scope of the disclosure as defined in the enclosed claims.

Figure 1:
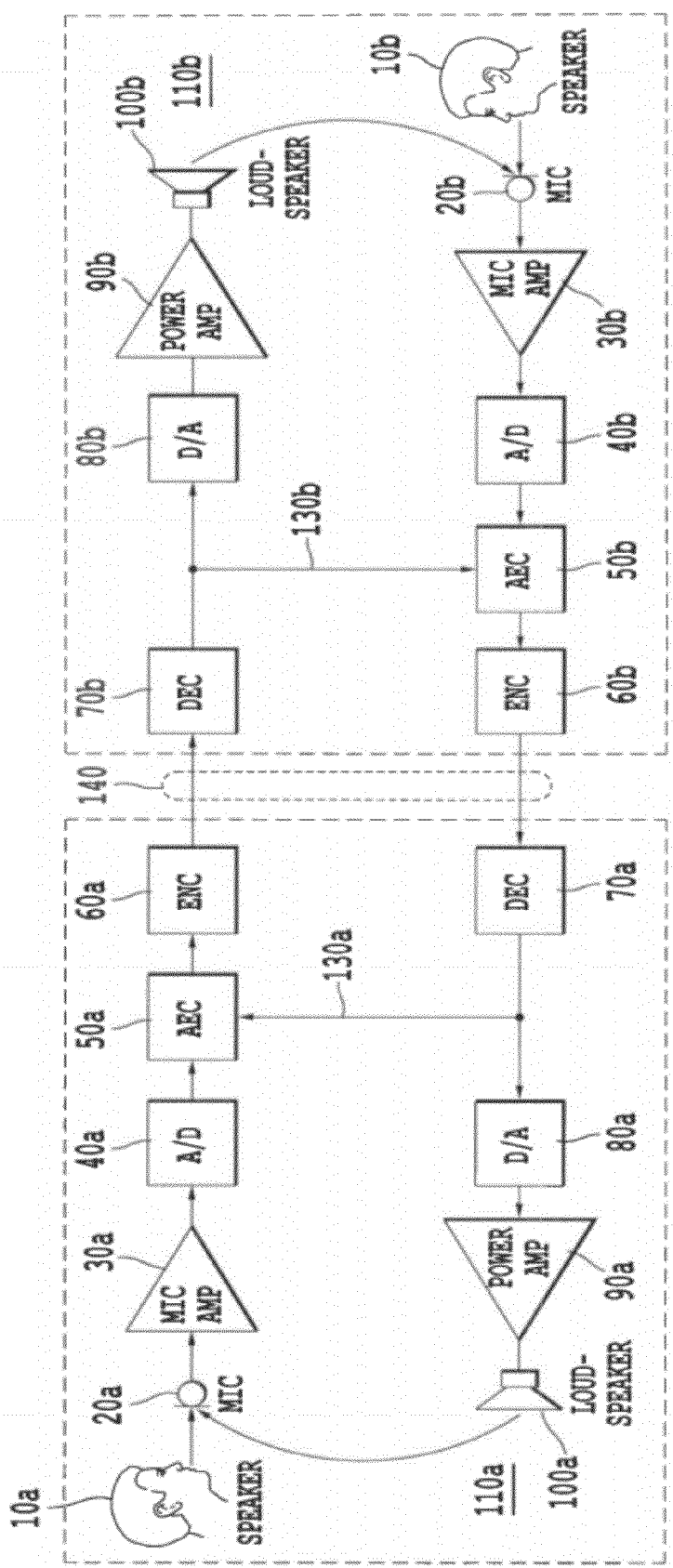
FIG. 1 is a schematic drawing of an audio distribution section of a video teleconferencing system that includes microphones according to an exemplary embodiment of the present disclosure.

FIG. 1 is a schematic representation of an audio portion of a video teleconferencing system. In FIG. 1, speaker 10*a*, in room 110*a*, and speaker 10*b*, in room 110*b*, are engaged in a video teleconference. Rooms 110*a* and 110*b* may be physically adjacent to each other in the same building, or separated by many hundreds or thousands of miles. Therefore, a communication link 140 is used to transfer video and audio data between rooms 110*a* and 110*b*.

The exemplary communication link 140 may be wired, such as a PSTN telephone system, Wide Area Network (WAN), Local Area Network (LAN), or Ad-hoc. The exemplary communication link 140 may also be a wireless, such as a cellular network, WiMax, Wifi, or via satellite link. Further, the communication link 140 may also be a combination of the wired and wireless networks.

Rooms 110*a* and 110*b* of FIG. 1 are mirror images of each other, and contain the same or similar equipment. Of course, those skilled in the art will recognize that alternative configurations are embodied by the advancements described herein. Each room 110*a* and 110*b* includes a toroid microphone 20*a* or 20*b*, a microphone amplifier 30*a* or 30*b*, an A/D converter 40*a* or 40*b*, an echo canceller 50*a* or 50*b*, an encoder 60*a* or 60*b*, a decoder 70*a* or 70*b*, a D/A converter 80*a* or 80*b*, a power amplifier 90*a* or 90*b*, and a loudspeaker 100*a* or 100*b*.

When speaker 10*a* speaks, the sound waves from his or her voice travel to toroid microphone 20*a* and are converted to electrical impulses. Microphone amplifier 30*a* amplifies these electrical impulses, and A/D converter 40*a* converts them to digital audio data. The digital audio data then travels to the echo canceller 50a, which taps the output of decoder 70a using transmission path 130a, to reduce any echo contained in the digital audio data. Once the echo has been reduced, the digitized audio data is transferred to the encoder 60a, which encodes the digitized signal according to a format of the communication link 140. The communication link 140 then carries the digitized audio data to room 110b.

Digital audio data received at room 110a is first decoded by the decoder 70a according to the transmission protocol of the communication link 140. This decoded digital audio data is used to reduce echo, as discussed above, and also converted into electrical impulses by the D/A converter 80a. The electrical impulses are amplified by the power amplifier 90a and converted to sound waves by the loudspeaker 100a.

Though the above description refers only to room 110a, it is equally applicable to room 110b. Therefore, the audio portions of the video teleconferencing systems in rooms 110a and 110b allow speakers 10a and 10b to simultaneously exchange audio data across the communication link 140.

Moreover, microphone amplifier 30a, A/D converter 40a, echo canceller 50a, encoder 60a, decoder 70a, D/A converter 80a, and power amplifier 90a may be implemented separately as hardware or software elements or integrated into a single device such as an ASIC "System on a Chip". Microphone amplifier 30b, A/D converter 40b, echo canceller 50b, encoder 60b, decoder 70b, D/A converter 80b, and power amplifier 90b may be similarly integrated, or individually implemented.

While a video teleconference is described above with respect to two speakers in two rooms, other configurations are also possible. For example, three or more rooms may be linked by communication link 140 to a common teleconference, and more than one speaker may also be present in each of the rooms. Additionally, a self-contained, table-top teleconference unit may be used to allow each speaker to join the teleconference without leaving their desk, and some speakers may also join the teleconference using audio-only communications. As can be appreciated by those skilled in the art, numerous other video teleconferencing configurations are possible without departing from the scope of the present disclosure.

Figure 2:
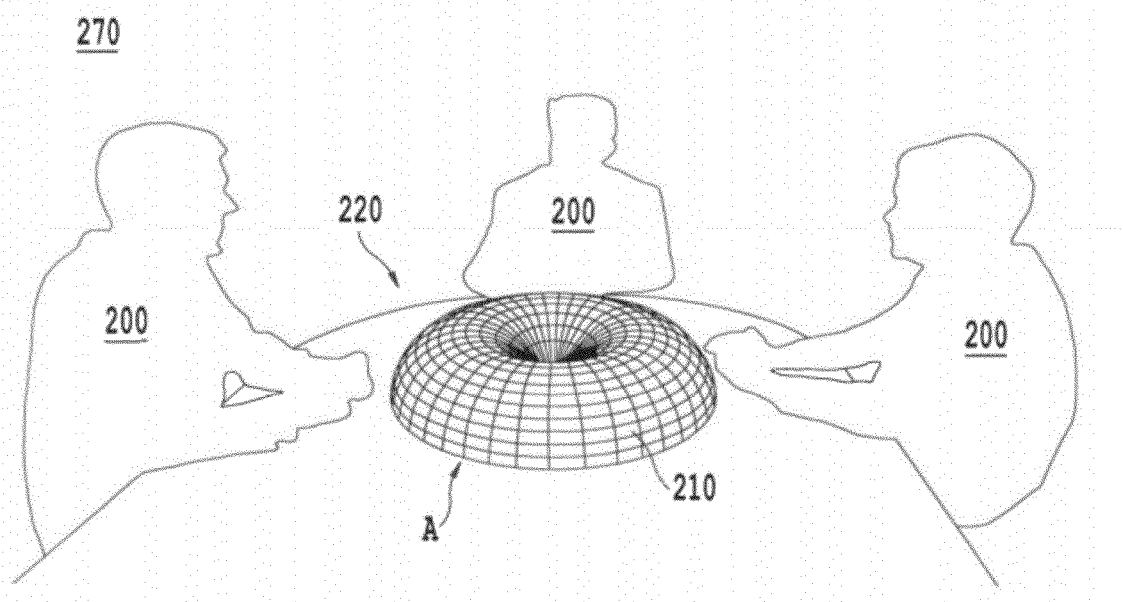
FIG. 2 is a schematic drawing of the toroid sensitivity pattern of a toroid microphone arranged on a table-top according to an exemplary embodiment of the present disclosure.

FIG. 2 is an illustration of the toroid directivity patterns of a toroid microphone according to an exemplary embodiment of the present disclosure. FIG. 2 includes microphone A (not visible in the figure) mounted on an exemplary table-top surface 220 of a table. The sensitivity pattern of microphone A is defined by sensitivity pattern 210. The directivity pattern 210 is essentially a toroidal directivity pattern, where the microphone A has a maximum sensitivity in the horizontal direction, close to the position of the sound source. Since the directivity pattern 210 is toroidal, the directivity is independent of azimuth angle of microphone A, but dependent upon its elevation angle. The toroid microphone according to the present invention may also be attached to an overhead mount (not shown), such as a Plexiglas plate or any mount comprising a plane surface on to which the microphone is attached, as those skilled in the art will recognize.

The sensitivity pattern 210 for the toroid microphone A defines areas of heightened sensitivity. For example, sensitivity lobe 210 is aligned with speakers 200. Thus, microphone A is more sensitive to sound originating from speakers 200 than from other sources, and is relatively insensitive to sound traveling directly perpendicular to the mount surface 220 (overhead noise) because of the gap in the center of the sensitivity pattern 210.

As one of ordinary skill in the art will recognize, the table may be of any shape, height, and material commonly used in the art. Further, speakers 200 may also be on the left side, behind the table, in front of the table, or at another position in room 270. Multiple speakers may also be accommodated by toroid microphones A without departing from the scope of the invention.

Microphone A uses only 2 omni directional microphone elements and a reflective supportive surface, to generate the sensitivity pattern 210. As shown in FIG. 3, a first microphone element 350 is positioned directly on the reflective surface 305, and a second microphone element 340 is positioned directly above the first microphone element 350. Thus, the microphone elements 340 and 350 are positioned along a line that is perpendicular to the reflective surface 305. As one of ordinary skill in the art will recognize, the reflective surface 305 may be the table surface 220 as described above. However, other reflective surfaces are also possible with out departing from the scope of the present invention.

With respect to FIG. 3, the audio entering the second microphone element 340 includes both an advanced and a delayed version of the audio entering the first microphone element 350. Combining N omni directions elements positioned with a distances $d_i$ above the surface results in the following pressure response:

$$E_N(k, \theta) = A_0 e^{-jkr} \sum_{i=1}^{N} [H_i(k)(e^{jkd_i\cos\theta} + e^{jkd_i\cos\theta})]$$

$$(1) = 2A_0 e^{-jkr} \sum_{i=1}^{N} [H_i(k)\cos(kd_i\cos\theta)].$$

where $A_0$ is the plane-wave amplitude, $H_i(k)$ are filters connected to each microphone and $d_i$ are small in comparison to the wavelength of the received audio. In the above equations, $k=\omega/c$ is the wave number, where $\omega$ is the angular frequency, c is the speed of sound, and $d_i$ is the distance from the reflective surface to a microphone i. Choosing N=2 and $d_1$=0, corresponding to FIG. 3, the pressure response is:

$$E(k,\theta)=2A_0 e^{-jkr}[H_1(k)+H_2(k)\cos(kd_2 \cos \theta)]. \quad (3)$$

Optionally, an equalizer filter $H_{EQ}(k)$ can be added to control the frequency response of the system:

$$E(k,\theta)=2A_0 e^{-jkr} H_{EQ}(k)[H_1(k)+H_2(k)\cos(kd_2 \cos \theta)] \quad (4)$$

As discussed above, the toroid microphone in FIG. 3 includes two omni directional microphone elements 340, 350, and one electronic filter 330 corresponding to frequency response $H_1(k)$ (In this embodiment, filter $H_2(k)$ in equation (4) is set to unity, $H_2(k)=1$). The output of the filter 330 is added to the output of microphone element 340 in the summing node 360 and equalized in equalizer filter 320, which has the frequency response $H_{EQ}(k)$. Thus, the overall output 370 of the toroid microphone 300 is the output of the equalizer filter 320.

The microphone elements 340 and 350 are arranged on the reflective surface 305 to capture both direct sound waves 310 and sound waves reflected 315 by the reflective surface 305. Microphone element 340 is placed directly on the reflective surface 305 to exploit the boundary principle described above. Microphone element 350 coincides with microphone element 340 with respect to a vertical axis, but is a distance ($d_2$) above the table 305. In the above description, distance ($d_2$) is less than half of a wavelength of a highest-frequency component to be captured by the toroid microphone 300.

In FIG. 3, direct sound waves 310 arrive at the reflective surface 305 at incoming angle (θ), are reflected by the reflective surface 305 to form reflected sound waves 315. Microphone element 350 captures both the direct sound waves and reflected sound waves from the reflective surface 305, making use of the pressure-doubling principle to increase sensitivity. Microphone element 340 receives both direct sound waves 310, and reflected sound waves 315 that are delayed with respect to the direct sound waves 310. The amount of delay of the reflected sound waves 315 depends on the incoming angle (θ) and the distance ($d_2$). Any sound waves originating below the reflective surface 305 are blocked thereby.

The sound waves captured by microphone elements 350 are converted to electrical impulses and provided to filter 330 for processing. The sound waves captured by microphone element 340 are converted to electrical impulses and provided to summing node 360. Filter 330 are connected to microphone element 350 and defines the directivity functions, and is selected as:

$$H_1(k) = -\cos(kd_2) \quad (5)$$

In the above equations, k=ω/c is the wave number, where ω is the angular frequency, c is the speed of sound, and $d_2$ is the distance from the reflective surface to the microphone 340.

The resulting electronic signals generated by filter 330 and the electronic signals generated by microphone element 340 are summed at a summing node 360 and then equalized by equalizer filter 320. The equalizer filter 320 defines the frequency response, and according to one embodiment of the present invention, for a substantially flat response at an incoming angle ($\theta_0$), is given by:

$$H_{EQ}(k) = \frac{1}{2[\cos(kd_2 \cos\theta_0)_1 - \cos(kd_2)]} \quad (6)$$

where k, $d_2$ and c are defined above, and $\theta_0$ can be selected depending on requirements, but should be an average incoming angle from the speakers. It could be offset a little lower than the average angle, as people sitting closer to the microphone do have a stronger direct sound. A typical value of $\theta_0$ is 70°, which approximates the average talker (or speaker) sitting at a horizontal distance of 1.25 meter, and with his mouth 0.45 meters above the table. It should be noted that an incoming angle of 70° is not limiting to the present invention. An elevation angle of 70° is considered suitable for most conference room configurations; however other angels between 30° and 80° may be used without departing from the scope of the present advancement.

Filters 330, 320 and summing node 360 may be implemented as digital structures, in which case A/D converters (not shown) convert the electrical impulses from microphone elements 340 and 350 into digital audio data. Filter 330 is preferably implemented as a finite impulse response (FIR) filters, however may also be implemented as infinite impulse response (IIR) filters as those skilled in the art will recognize. If filter 330 is linear phase, a delay must be added to the other path (the signal from the microphone 340 above the table) to emulate a non-causal filter. Further, the equalizer $H_{EQ}(k)$ may also be implemented as IIR or FIR filters.

Figure 4:
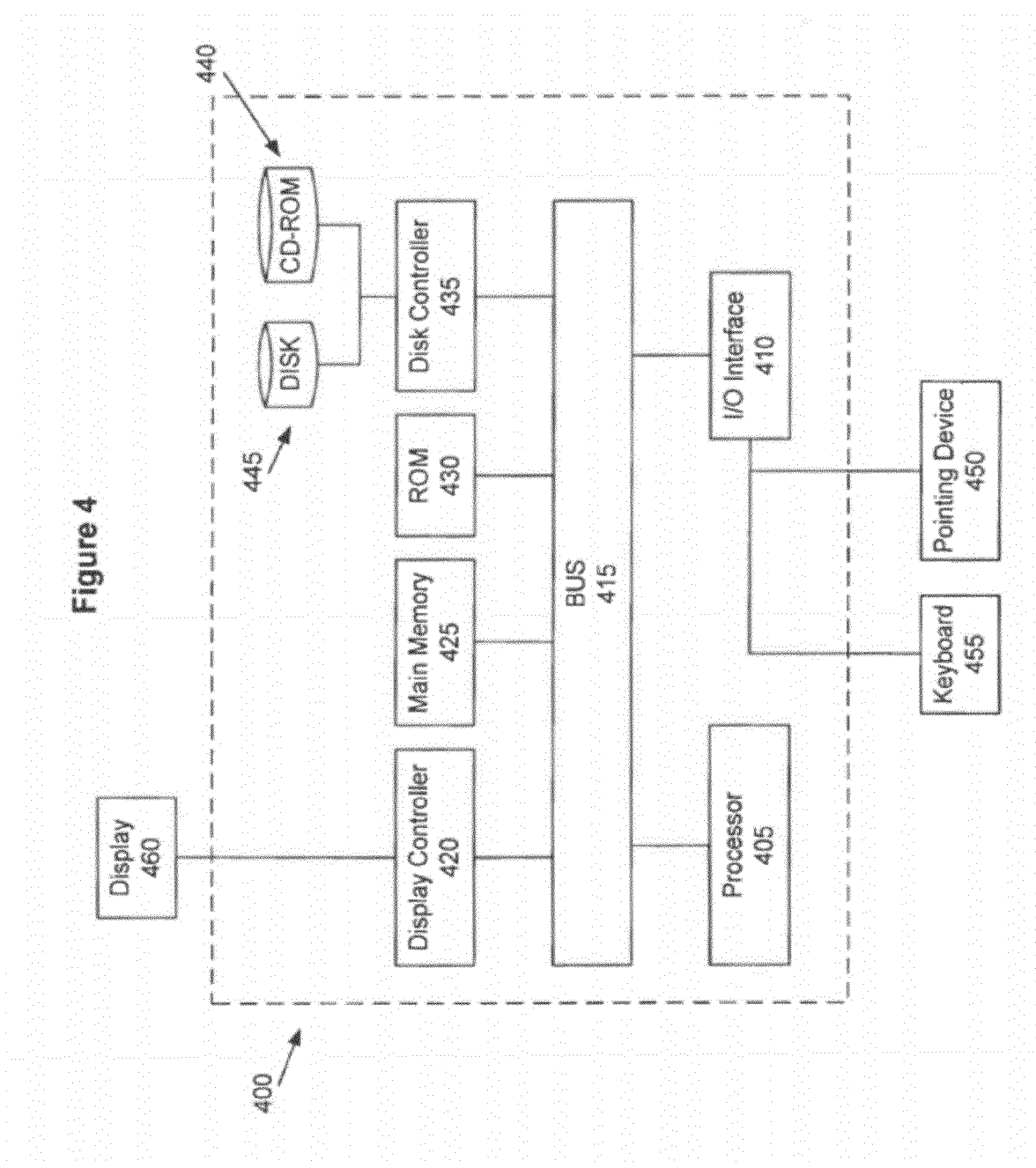
FIG. 4 is a schematic drawing of a processor to implement frequency response functions $H_1(k)$, $H_2(k)$ and $H_{EQ}(k)$ according to an exemplary embodiment of the present disclosure.

Filters 330, summing node 360 and equalizer filter 320 may also be implemented separately or integrated in a single device. For example, filter 330, summing node 360 and equalizer 320 may be implemented on a PC computer 400, such as the one in FIG. 4. The computer 400 includes a processor 405 for performing computations, a read-only memory (ROM) 430 for storing programming instructions, and a main memory 425 that may include RAM memory, FLASH memory, EEPROM memory or any other rewritable memory. The main memory 425 stores temporary data, instructions, etc. The computer 400 also includes a display controller 420 for controlling a display device 460, a disk controller 435 for controlling a hard disk 445 and/or a CD-ROM drive 440, and an I/O interface 410 for controlling a pointing device 450 and a keyboard 455. A bus 415 interconnects all of the above-described components.

Hard disk drive 445 and CD-ROM drive 440 may be integrated into the computer 400, or may be removable. Likewise, at least a portion of the main memory 425 may also be removable. Though not shown in FIG. 4, the I/O interface 410 may also interface to a network, phone system, WiFi network, cellular network, WAN, LAN, etc.

The frequency responses ($H_1(k)$, $H_2(k)$ and $H_{EQ}(k)$) and the summing node 335 may also be implemented on computer 400 as a utility application, background demon, or component of an operating system, or any combination thereof executing in conjunction with the processor 405 and an operating system, such as Microsoft VISTA, UNIX, SOLARIS, LINUX, Apple MAC-OS and other systems known to those skilled in the art.

Further, filter 330, summing node 355 and equalizer 320 may be implemented in hardware, together or separately, on devices such as FPGA's, ASIC's, microcontrollers, PLD's, or other computer readable media such as an optical disc.

FIG. 5 includes a series of polar responses for a table-top toroid microphone with dimension ($d_2$) equal to 0.02 meters. The polar responses are only defined for angles above the surface on which the toroid microphone is placed, because the surface blocks any sound waves from angles 90° to 270°. Each graph corresponds to the toroid microphone response at a different frequency. Frequencies of 100 hertz, 240 hertz, 577 hertz, 1,386 hertz, 3,330 hertz and 8,000 hertz are represented, by way of example. However, a toroid microphone response may be generated for any frequency.

Figure 6A:
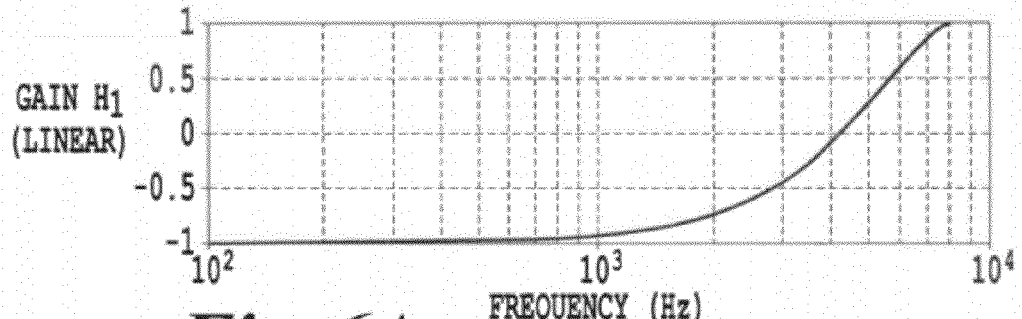
FIGS. 6A-6B are magnitude plots of the response ($H_1(k)$) according to the first exemplary embodiment of the present disclosure.
Figure 6B:
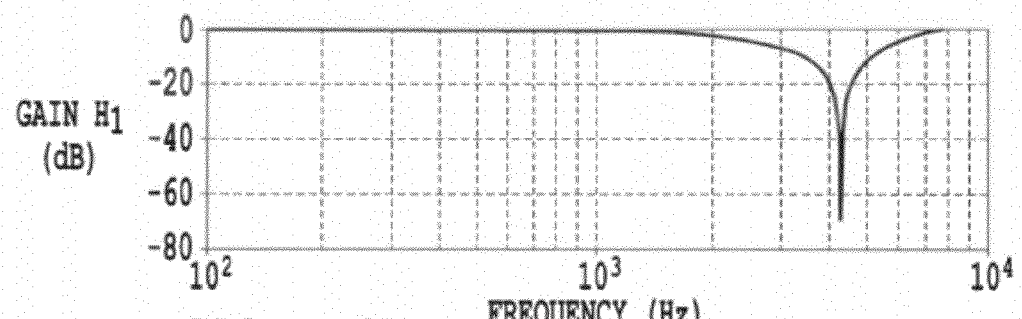

FIGS. 6A-6B are magnitude response plots for the frequency response ($H_1(k)$) corresponding to filter 330. FIG. 6A is a linear response and FIG. 6B a response in decibels. The solid lines correspond to a distance ($d_2$) of 0.02 meters in FIGS. 6A-6B. Filter 330 may be implemented as a linear phase (FIR) filter, but other implementations such as an IIR filter or an analog filter are also possible.

Figure 7A:
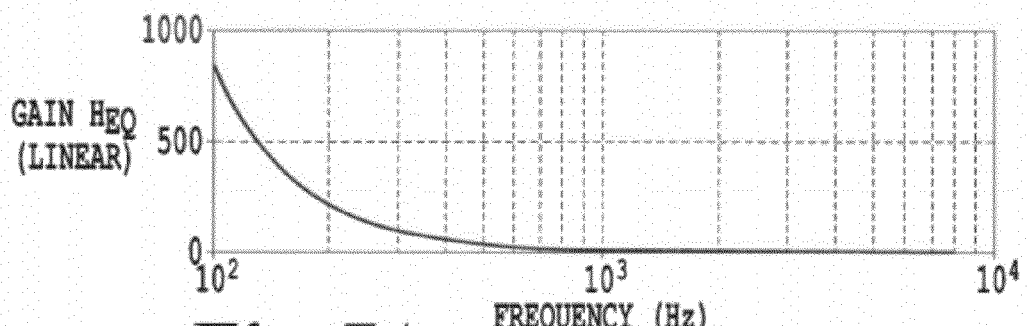
FIGS. 7A-7B are magnitude plots of the frequency response ($H_{EQ}(k)$) according to the first exemplary embodiment of the present disclosure.
Figure 7B:
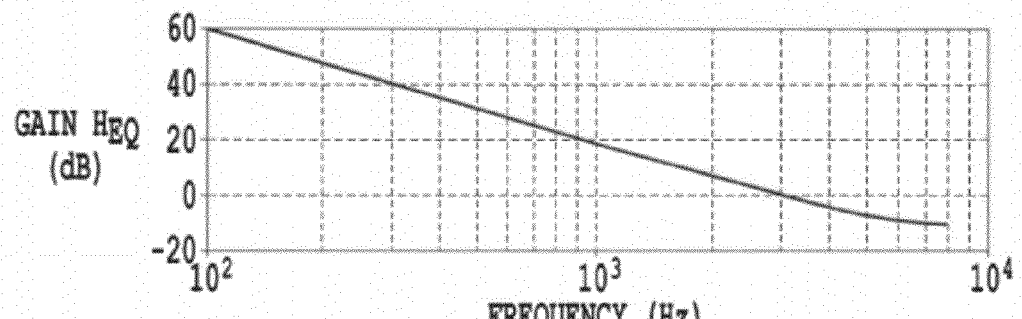

A magnitude plot corresponding to the frequency response ($H_{EQ}(k)$) of the equalizer 320 is included in FIGS. 7A-7B both as a linear scale graph (FIG. 7A) and a logarithmic (decibel) scale graph (FIG. 7B). The equalizer 320 may be implemented as a linear phase (FIR) filter, but other implementations such as an IIR filter or an analog filter are also possible. Further, in FIGS. 7A-7B, solid lines correspond to a distance ($d_2$) of 0.02 m.

The gain of equalizer 320 at low frequencies may amplify internal noise generated by the microphone elements 340 and 350, which is undesirable. In addition, the low frequency gain of the equalizer 320 may also amplify A/D converter noise, quantization noise or noise due to numerical rounding.

Alternatively, some of the low frequency gain of the equalizer 320 may be transferred to filter 330 and to a new filter $H_2(k)$ associated with microphone 340. This may reduce numerical/quantization noise problems originating at or after filter 330. Additionally, some degradation of the directivity pattern at low frequencies may be accepted in exchange for filter response that eliminates noise at low frequencies. Likewise, some degradation in the high frequency sensitivity pattern may be acceptable in order to reduce system noise.

FIG. 8 is a toroid microphone 800 according to a second exemplary embodiment of the present invention. Referring to equation (4) above, and choosing $H_2(k)=\beta_2$ and $H_{EQ}(k)=1$ the pressure response of the two omni directional microphones in FIG. 8a can be written:

$$E(k,\theta)=2A_0 e^{-jkr}[H_1(k)+\beta_2 \cos(kd_2 \cos\theta)], \quad (7)$$

which series expansion of order two can be written $$E(k,\theta) \simeq 2A_0 e^{-jkr}\left[H_1(k) + \beta_2\left(1 - \frac{1}{2}(kd_2)^2\cos^2\theta\right)\right]. \quad (8)$$

Choosing $$H_1(k) = \frac{1}{2}(kd_2)^2 - \beta_2 \quad (9)$$

Results in a response $$E(k,\theta)=A_0 e^{-jkr}(kd_2)^2(1-\beta_2\cos^2\theta). \quad (10)$$

Thus, various degree of the toroidal pattern can be created by changing the constant $\beta_2$, where $\beta_2=0$ result in an omni directional pattern, and $\beta_2=1$ approximate a second order toroidal pattern as shown in FIGS. 2 and 5.

Therefore, the toroid microphone 800 according to the second exemplary embodiment includes two omni directional microphone elements 810 and 820, one electronic filter 830 corresponding to frequency response $H_1'(k)$ (dealing with parts of the $H_1(k)$ in equation 9), an electronic filter 835 corresponding to frequency response $H_1''(k)$ (dealing with the remaining parts of the H1(k) in equation 9), and an electronic filter 840 corresponding to frequency response $H_2(k)$. An adder 855 combines the outputs of filters 830, 835 and 840 into an adder output by adding the outputs of the filters 830 and 840 and subtracting the output of the filter 835.

According to one exemplary embodiment, the adder assembly comprises two summing nodes 850 and 860, where the output of the filter 830 is added to the output of the filter 840 in the summing node 850, and the output of the filter 835 is subtracted from the output of the summing node 850 in the summing node 860. The overall output of the toroid microphone 870 is the output of the adder assembly 855.

Figure 8A:
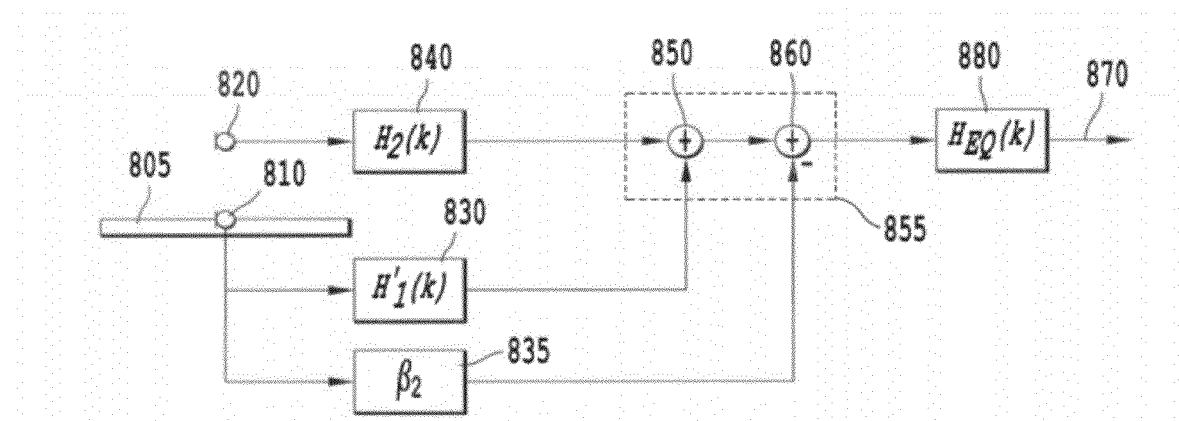
FIG. 8*a* which is an overall schematic drawing of the toroid microphone according to the second exemplary embodiment, FIG. 8*b* which is a schematic drawing of the adder 850 in FIG. 8*a*, FIG. 8*c* which is a schematic drawing of the adder 860 in FIG. 8*a*, FIG. 8*d* which is a schematic drawing of the filter 830 in FIG. 8*a*.
Figure 8B:
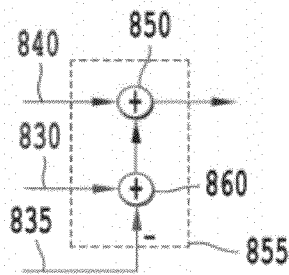
FIG. 8 is a schematic drawing of a toroid microphone according to a second exemplary embodiment of the present disclosure, FIG. 8 includes.
Figure 8C:
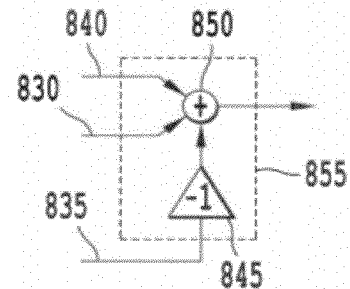

As one of skill in the art will recognize, the adder described above is merely exemplary, and other adder configurations are possible. For example, in FIG. 8b, the adder 855 comprises two summing nodes, where the output of filter 835 is subtracted from the output of filter 840 in a summing node 860. The output of summing node 860 is added to the output of filter 840 in a summing node 850, so that the output of adder assembly 855 is the output of summing node 850. In FIG. 8c another exemplary embodiment of the adder 855 includes a summing node and a signal amplifier with a negative unity gain. The output of filter 835 is amplified by amplifier 845, and the output of filter 840 is added to the output of filter 830 and the output of amplifier 845 in summing node 850, so that the output of adder assembly 855 is the output of summing node 850.

Figure 8D:
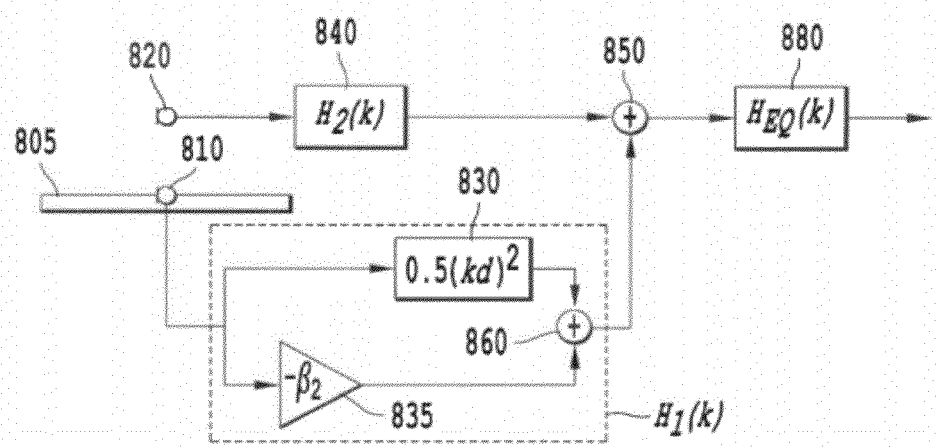

The subtraction of the output of the filter 835 discussed above may also be achieved by applying a negative gain, $-\beta_2$, in filter 835 and then adding the output of the filter 835 to the output of filter 840 and 830, as shown in FIG. 8d. Therefore, in another exemplary embodiment shown in FIG. 8d, the adder 855 includes two summing nodes 850 and 860, and filter 835 is an amplifier having a gain $-\beta_2$. The output of filter 835 and the output of filter 840 is added in summing node 860, and the output of filter 840 and the output of summing node 860 is added in summing node 850, such that the adder 855 adds the signal from microphone 810 filtered by 830 and the signal from microphone 820 filtered by filter 840, and subtracts the signal from microphone 810 amplified by a gain $\beta_2$.

The microphone elements 810 and 820 are arranged on the table 805 (or surface) to capture both direct sound waves and sound waves reflected by the table 805. Microphone element 810 is placed directly on the table 805 to exploit the boundary principle. Microphone element 820 coincides with microphone element 810 with respect to a vertical axis, but is a distance ($d_2$) above the table 805. In the above description, distance ($d_2$) is preferably less than half of a wavelength of a highest-frequency component to be captured by the toroid microphone 800. However, other values for $d_2$ are also possible as will be recognized by those skilled in the art. Therefore the distance ($d_2$) is preferably in the range 0.01 m-0.2 m, but can be other values without departing from the scope of the present invention.

In FIG. 8, direct sound waves arrive at the table 805 at incoming angle ($\theta$), as shown in FIG. 3, are reflected by the table 805 to form reflected sound waves at reflected angle. Microphone element 810 captures both the direct sound waves and reflected sound waves from the table, making use of the pressure-doubling principle to increase sensitivity. Microphone element 820 receives both direct sound waves, and reflected sound waves that are delayed with respect to the direct sound waves. The amount of delay of the reflected sound waves depends on the incoming angle ($\theta$) and the distance ($d_2$). Any sound waves originating below the table are blocked by the table surface 805.

The sound waves captured by microphone elements 810 and 820 are converted to electrical impulses and provided to filters 830, 835 and 840 for processing. In a first microphone element assembly, filter 830 is connected to microphone element 810 and is selected as:

$$H_1'(k) = \frac{1}{2}(kd_2)^2 \quad (11)$$

In the above equation, $k=|k|=\omega/c$ is the wave number, where $\omega$ is the angular frequency, c is the speed of sound, and $d_2$ is the distance from the reflective surface to the microphone 820. In a second microphone element assembly, filter 835 is connected to microphone element 810 and is selected as $$H_1''(k)=\beta_2 \quad (12)$$

Referring to equation 9 above, $H_1(k)=H_1'(k)-H_1''(k)$. In a third microphone element assembly, filter 840 is connected to microphone element 820, and is selected as:

$$H_2(k)=\beta_2 \quad (13)$$

In the above equation $\beta_2$ is a constant. Filters 840 and 835 can be an amplifier, such as an operational amplifier, having a gain $\beta_2$.

The resulting electronic signals generated by filter 830, the resulting electronic signals generated by filter 840 and the resulting electronic signals generated by filter 835 are combined in adder assembly 855, such that the resulting electronic signals generated by filter 830 and 840 are added and the resulting electronic signals from filter 835 is subtracted.

According to one non-limiting exemplary embodiment, the resulting electronic signals generated by filter 830 and the resulting electronic signals generated by filter 840 are summed at a summing node 850. Further, the resulting electronic signals generated by filter 835 are subtracted from the resulting electronic signals generated by summing node 850 at a summing node 860. Alternatively, the resulting electronic signals generated by filter 835 are subtracted from the resulting electronic signals generated by filter 830 at a summing node (not shown), and then the resulting electronic signals from said summing node (not shown) and the resulting electronic signals generated by filter 840 are summed at summing node 850. In the latter alternative, the overall output 870 of the toroid microphone 800 would correspond to the output of the summing node 850. The filters 830, 835 and 840 define the directivity of the toroid microphone 800.

The output of adder assembly 855 are then equalized by equalizer filter 880. The equalizer filter 880 adjust the frequency response, and can in the second embodiment of the present invention be designed as $$H_{EQ}(k)=K^*H_{LP}(k)^*H_{HP}(k) \qquad (14)$$

where $H_{LP}(k)$ is a second order Butterworth lowpass filter that flatten the farfield response using its $1/\omega^2$ slope. The cutoff frequency of $H_{LP}(k)$ defines the lower frequency limit of the toroidal-like directivity pattern. The proper choice of the cutoff frequency depends on microphone self noise. Gain factor K and a high pass filter $H_{LP}(k)$ are optional. Gain factor K and a high pass filter $H_{LP}(k)$ are connected in series with $H_{LP}(k)$ and attenuates unwanted low frequent noise outside the speech spectrum. The phase response of filter 880 is not critical, and the response can therefore efficiently be implemented as one or more infinite impulse response (IIR) filters. Alternatively, the equalization described above is embedded in filters 830, 835 and 840.

Filters 830, 835, 840, 880, and adder assembly 855 (e.g. summing nodes 850 and 860) may be implemented as digital structures, in which case A/D converters (not shown) convert the electrical impulses from microphone elements 810 and 820 into digital audio data. Filters 830, 835, 840, 880 may then be implemented as infinite impulse response (IIR) filters or finite impulse response (FIR) filters. Filter 830 is preferably implemented as a finite impulse response (FIR) filters, but may be implemented as infinite impulse response (IIR) filters. If filter 330 is a linear phase, a delay must be added to the other paths (the signal paths of the second and third microphone element assembly) to emulate a non-causal filter.

As mentioned above equalization may be embedded in filters 830, 835 and 840. Then in the first microphone element assembly, the filter 830 is selected as:

$$H_1'(k)=1 \qquad (15)$$

In the second microphone element assembly, filter 835 is selected as $$H_1''(k) = \beta_2 \frac{2}{(kd)^2} \qquad (16)$$

Where, referring to equation 9 above, $H_1(k)=H_1'(k)-H_1''(k)$. In the third microphone element assembly, filter 840 is selected as:

$$H_2(k) = \beta_2 \frac{2}{(kd_2)^2} \qquad (17)$$

In the above equation $\beta_2$ is a constant. In this alternative $H_{EQ}$ may be omitted.

A known metric in microphone technology is the directivity factor D, which describes the gain of the microphone, or microphone array, over that of an omni directional microphone placed in the same sound field. The calculation of the directivity factor is known and a discussion thereof is omitted for the sake of brevity.

The directivity factor is often presented in a logarithmic scale and then known as the directivity index (DI), $$DI=10 \log_{10}D(dB)$$

FIGS. 9A-9B show how the directivity index DI vary for different values of $\beta_2$ with various noise power distributions, $u(\omega, \theta, \phi)$, for $\theta_0=90°$ (FIG. 9A) and $\theta_0=70°$ (FIG. 9B). Based on FIGS. 9A-9B, $\beta_2$ is preferably greater than 1 is a better choice for these noise fields and that the directivity index can be improved with more than 1 dB in several cases by a more suitable choice of $\beta_2$.

For $\theta_0=90°$ it was calculated that the directivity index for the toroid microphone according to the second embodiment of the present invention was at its maximum, $$D_{MAX} = \frac{9}{4},$$

when $$\beta_2 = \frac{5}{3} \simeq 1,67.$$

Figure 10:
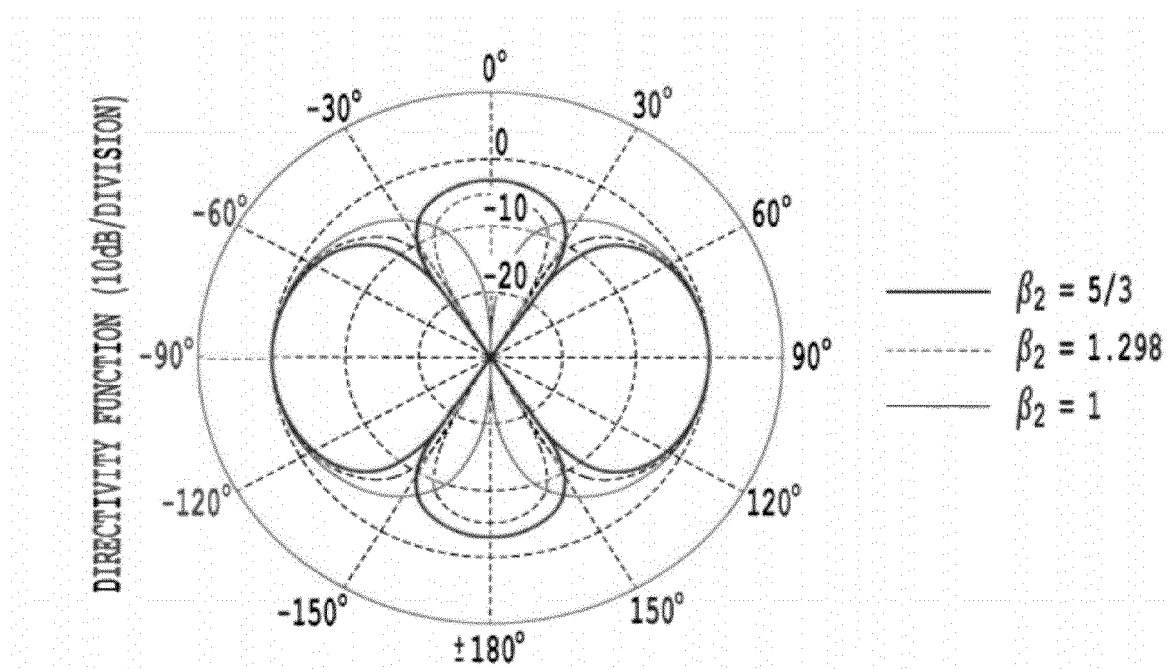
FIG. 10 is a plot of the directivity function for three different values of $\beta_2$ corresponding to a toroid microphone according to the second exemplary embodiment of the present disclosure.

The maximum directivity factor 9/4 corresponds to the directivity index 3.5 dB. This small improvement over the second order toroidal pattern ($\beta_1 2=1$) is still noticeable. As the polar plot in FIG. 10 shows, the first nulls are positioned at $$\theta_1 = \pm\cos^{-1}\sqrt{\frac{\beta_0}{\beta_2}} == \pm\cos^{-1}\sqrt{\frac{3}{5}} \simeq \pm 39°. \qquad (18)$$

Figure 11:
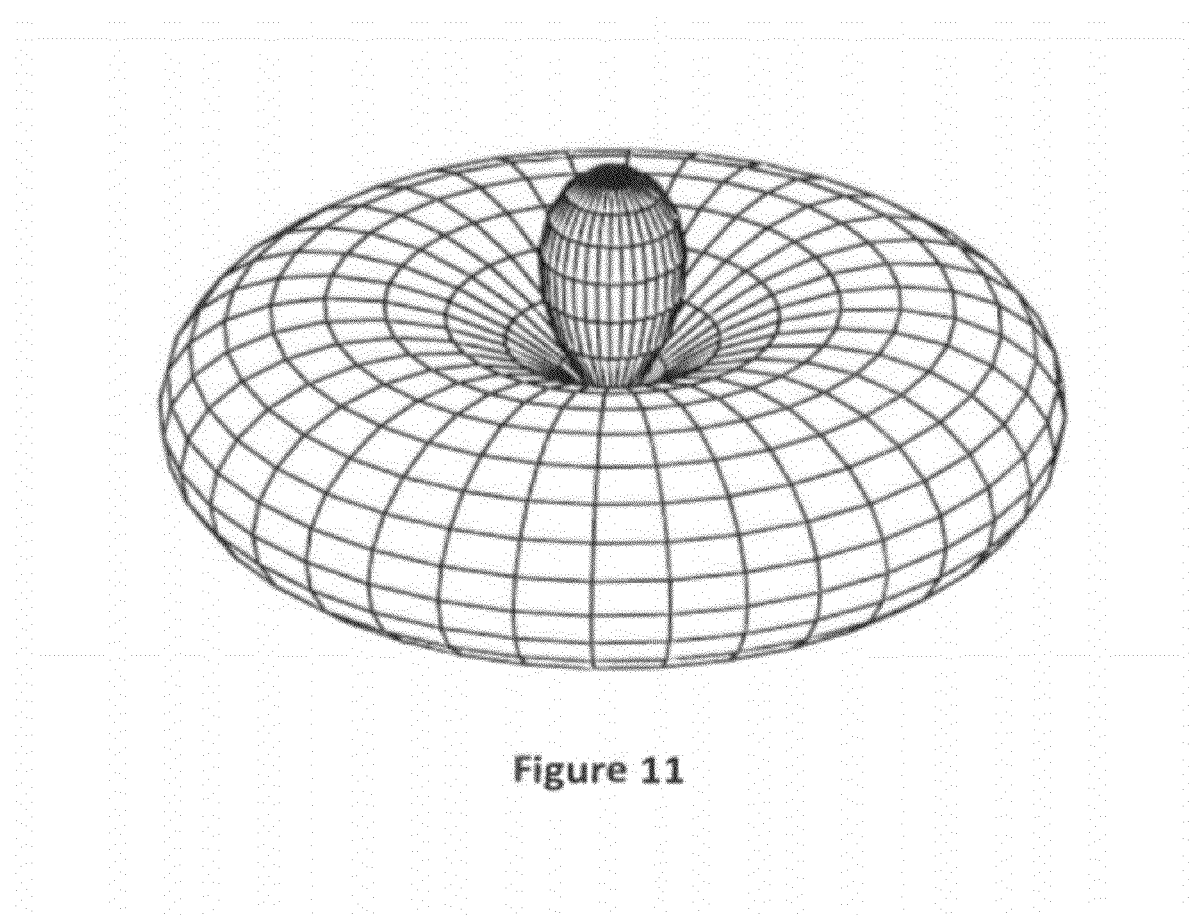
FIG. 11 is a directivity pattern with maximized directivity index shown in linear scale for a toroid microphone according to the second exemplary embodiment of the present disclosure.

The proper choice of $\beta_2$ ultimately depends on the noise field in the room; the microphone's distance to nearby noise sources compared to their reverberation radius, r_c. The reverberation radius, sometimes referred to as the critical distance is the distance where the contribution from the direct sound field equals the contribution from the diffuse fields. In practice, it is preferable that a value of $\theta_0$ to coincide with the angle of incoming noise from a significant noise source, such as noise from to a nearby HVAC-system outlet, the loudspeakers ceiling reflection, etc. In many cases, this angle will differ from $\theta_0=0$. FIG. 11 is the directivity pattern of the toroid microphone according to the second embodiment of the present advancement with a maximized Di in linear scale.

Figure 12:
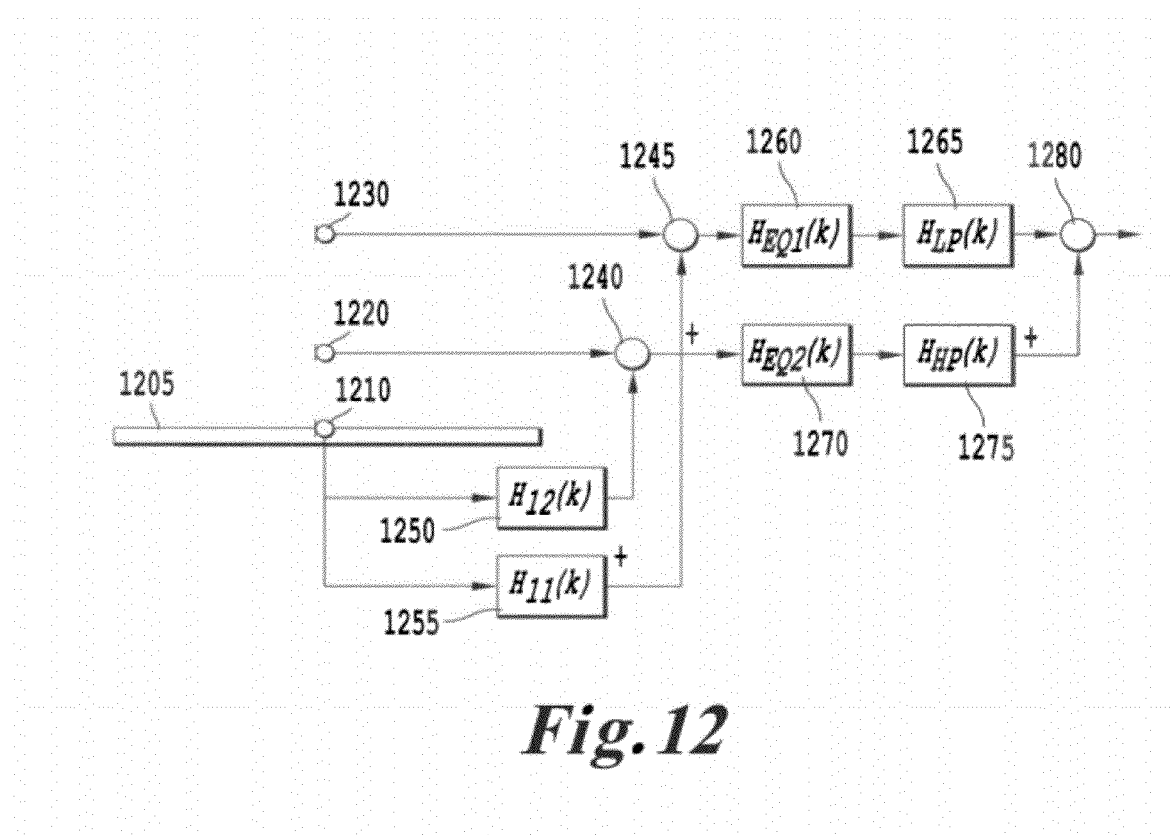
FIG. 12 is a schematic diagram of a toroid microphone according to a third exemplary embodiment of the present disclosure.

FIG. 12 is another exemplary embodiment of a toroid microphone according to the present disclosure. In FIG. 12 three omni directional microphone elements 1210, 1220 and 1230 are used to reduce the impact of system noise. Microphone element 1210 is placed directly on the table surface 1205, and microphone element 1220 and 1230 are aligned to microphone 1210 with respect to a vertical axis. Microphone 1220 is a distance ($d_2$) above microphone 1210, and microphone 1230 is at a distance ($d_3$), approximately four times the distance ($d_2$), above microphone 1210. Further, microphone 1210 is connected to filters 1250 and 1255

The output of the filter 1250 and the output of the microphone element 1220 are summed in high frequency summing node 1240. The output of the filter 1255 and the output of the microphone element 1230 are summed in low frequency summing node 1245. The output of the low frequency summing node 1245 is equalized by low frequency equalizer 1260 and then filtered by low pass filter 1265. Likewise, the output of the high frequency summing node 1240 is equalized by high frequency equalizer 1270 and then high pass-filtered by high pass filter 1275. The outputs of low pass filter 1265 and high pass filter 1275 are summed at the summing node 1280 to obtain the output of the toroid microphone.

Operationally, microphones 1210 and 1220 capture high frequency sound waves, and convert them to electrical impulses. The electrical impulses from microphone 1210 are filtered by filter 1250. The filter output of 1250 are added together with the electrical impulses from microphone 1220 by high frequency summing node 1240, and equalized by high-frequency equalizer 1270. Then the high pass filter 1275 removes any low frequency components remaining in the output of equalizer 1270.

Likewise, microphones 1210 and 1230 capture low frequency sound waves, and convert them to electrical impulses, and electrical impulses from microphone 1210 are filtered by filter 1255. The filter output and electrical impulses from microphone 1230 are then added together by low frequency summing node 1245, and equalized by equalizer 1260. Low pass filter 1265 removes any remaining high frequency components. Then the outputs of low pass filter 1265 and high pass filter 1275 are added together by summing node 1280 to generate the overall toroid microphone output.

Thus, the toroid microphone of FIG. 12 uses microphones 1210 and 1220, which are closely spaced together, to capture high-frequency sound waves, and microphones 1210 and 1230, which are spaced further apart, to capture low-frequency sound waves. In other words, $H_{LP}(k)$ and $H_{HP}(k)$ are low pass filter and high pass filter, respectively. For the low frequency path of the system, $H_{11}(k)$ and $H_{EQ1}(k)$ correspond to the filters $H_1(k)$ and $H_{EQ}(k)$ in the one way system described earlier according to the first exemplary embodiment, but with k=2k. For the high frequency path of the system, $H_{12}(k)$ and $H_{EQ2}(k)$ correspond to the filters $H_1(k)$ and $H_{EQ}(k)$ in the one way system described earlier according to the first exemplary embodiment. This two-way system implements a high frequency toroid sensitivity pattern and a low frequency toroid sensitivity pattern to remove system noise without distorting microphone sensitivity. As can be appreciated by those skilled in the art, the two-way system of FIG. 12 may be extended to a three-way system, four-way system, or even an n-way system, where n is any positive integer. Further, any of the above-described system noise reduction techniques may be combined to further optimize performance of the toroid microphone. Further, as will be recognized by those skilled in the art, the two-way system of FIG. 12 may be implemented for the filter design as described earlier according to the second exemplary embodiment of the invention.

For low frequencies, the gain of the filter $H_{EQ}(k)$ increases. This may lead to noise problems in low frequencies, due to self noise in the microphone element. This is unavoidable for differential microphone designs, thus this is not any unique challenge for this design. In fact, since using fewer microphones elements, fewer elements contribute to the overall noise.

The above discussion has been made with reference to omni directional microphone elements, and all types of omni directional microphone elements may be used without departing from the spirit of this disclosure. For example, electrets microphones, optical microphones and/or MEMS microphones may be used. MEMS microphones have the advantage of allowing better microphone matching since microphone elements fabricated on the same silicon wafer or the same silicon die can be used. Matching of microphone elements is important to minimize the self noise of the microphone according to the present invention. Of course, the filter responses and the equalizer response ($H_{EQ}(k)$) may have to be modified accordingly. Further, microphones with optical readout have self noise which is expected to be order of magnitude less than the widely used electret microphones.

A degradation of the directivity pattern at low frequencies can be accepted, for example at low frequencies using only the microphone located directly at the table, reducing the noise challenge.

As first recognized by the present inventors, the toroid microphone as described herein is independent of azimuth angle, which makes it more suitable for video teleconference settings where multiple speakers and/or movable sound sources require good sensitivity in multiple directions. Further, the toroid microphone has nearly zero sensitivity for audio sources above the microphone. Further, the directivity pattern of the toroid microphone according to the second embodiment of the present invention can be adjusted to accommodate the room in which the microphone is placed, by changing the constant $\beta_2$. By altering $\beta_2$ the microphone's "blind spot" (the angle $\theta$ where the sensitivity is close to zero) can be set to coincide with the incoming sound of audio from noise sources, such as ceiling fans etc. Therefore, noise interference is significantly reduced, and because the toroid microphone is a directional microphone, it inherently limits reverberant sound.

The present advancement uses only two microphone elements to create a microphone with a toroidal directivity pattern, reducing cost (both because of reduced material cost and reduced calibration cost) and diminishing implementing problems with phase matching and microphone element matching.

Obviously, numerous modifications and variations of the present invention are possible in light of the above teachings. It is therefore to be understood that within the scope of the appended claims, the invention may be practiced otherwise than as specifically described herein.

The invention claimed is:

1. A toroid microphone comprising:
   a first microphone element arranged adjacent to a reflecting surface;
   a second microphone element arranged at a predetermined distance ($d_2$) above the first microphone element;
   a first filter connected to the first microphone element and having a frequency response $H_1'(k)$;
   a second filter connected to the first microphone element and having a frequency response $H_1''(k)$;
   a third filter connected to the second microphone element and having a frequency response $H_2(k)$; and
   an adder configured to combine outputs of the first, second and third filters into a toroid microphone output by adding the outputs of the first and third filters and subtracting the output of the second filter,
   wherein the frequency responses of the first, second and third filters combine to generate a toroid directivity pattern for the toroid microphone.

2. The toroid microphone according to claim 1, wherein the toroid directivity pattern has a minimum sensitivity at elevation angle ($\theta_1$).

3. The toroid microphone according to claim 1, wherein the predetermined distance ($d_2$) is a maximum of one half of a wavelength corresponding to a highest frequency captured by the toroid microphone.

4. The toroid microphone according to claim 1, wherein the first and second microphone elements are omni directional microphones.

5. The toroid microphone according to claim 1, wherein each of the first filter, second filter and third filter is a digital filter.

6. The toroid microphone according to claim 1, wherein each of the second filter and third filter is an amplifier.

7. The toroid microphone according to claim 1, wherein $\omega$ is an angular frequency, c is a speed of sound through air and $$k = \frac{\omega d_2}{c}, H'_1(k) = \frac{1}{2}(kd_2)^2, H''_1(k) = \beta_2, H_2(k) = \beta_2.$$

8. The toroid microphone according claim 7, wherein the minimum sensitivity at elevation angle ($\theta_1$) corresponds to a value of $\beta_2$, and $\beta_2 \geq 1$.

9. The toroid microphone according to claim 1, wherein $\omega$ is an angular frequency, c is a speed of sound through air and $$k = \frac{\omega d_2}{c}, H'_1(k) = 1, H''_1(k) = \beta_2 \frac{2}{(kd_2)^2}, H_2(k) = \beta_2 \frac{2}{(kd_2)^2}.$$

10. The toroid microphone according to claim 9, wherein the minimum sensitivity at elevation angle ($\theta_1$) corresponds to a value of $\beta_2$, and $\beta_2 \geq 1$.

11. A method for creating a toroid directivity pattern for a toroid microphone, comprising:
converting, in a first microphone element, audio waves into corresponding first audio data, the first microphone element being located on are reflective surface;
converting, in a second microphone element, audio waves into a corresponding second audio data, the second microphone element being located a predetermined distance ($d_2$) from the reflective surface;
filtering, in a first filter, the first audio data according to a first frequency response $H_1'(k)$;
filtering, in a second filter, the first audio data according to a second frequency response $H_1''(k)$;
filtering, in a third filter, the second audio data according to a third frequency response $H_2(k)$;
adding, in a first adder, outputs of the first and third filters; and
subtracting, in a second adder, the output of the second filter from the output of the first adder to generate a toroid microphone output,
wherein $H_1'(k)$, $H_1''(k)$ and $H_2(k)$ combine to generate a toroid directivity pattern for the toroid microphone.

12. The method according to claim 11, wherein the toroid directivity pattern has a minimum sensitivity at elevation angle ($\theta_0$).

13. The method according to claim 11, wherein the predetermined distance ($d_2$) is a maximum of half of a wavelength corresponding to a highest frequency captured by the toroid microphone.

14. The method according to claim 11, wherein $\omega$ is an angular frequency, c is a speed of sound through air and $$k = \frac{\omega d_2}{c}, H'_1(k) = \frac{1}{2}(kd_2)^2, H''_1(k) = \beta_2, H_2(k) = \beta_2.$$

15. The method according to claim 14, wherein the minimum sensitivity at elevation angle ($\theta_1$) corresponds to a value of $\beta_2$, and $\beta_2 \geq 1$.

16. The method according to claim 11, wherein $\omega$ is an angular frequency, c is a speed of sound through air and $$k = \frac{\omega d_2}{c}, H'_1(k) = 1, H''_1(k) = \beta_2 \frac{2}{(kd_2)^2}, H_2(k) = \beta_2 \frac{2}{(kd_2)^2}.$$

17. A toroid microphone comprising:
a first microphone element disposed on a reflective surface;
a second microphone element disposed at a predetermined distance ($d_2$) above the reflective surface;
a first filter connected to the first microphone element and having a frequency response of $H_1(k)$
an adder configured to combine outputs of the first filter and the second microphone element into an adder output; and
an equalizer configured to generate an equalized output in response to the adder output,
wherein a combination of the frequency response of the first filter and the output of the second microphone element generates a toroid directivity pattern for the toroid microphone.

18. The toroid microphone according to claim 17, wherein the predetermined distance ($d_2$) is a maximum of half of a wavelength corresponding to a highest frequency captured by the toroid microphone.

19. The toroid microphone according to claim 17, wherein the first and second microphone elements are omni directional microphones.

20. The toroid microphone according to claim 17, wherein each of the first filter and equalizer is a digital filter.

21. The toroid microphone according to claim 17, said equalizer has a frequency response $H_{EQ}(k)$, $\omega$ is an angular frequency, c is a speed of sound through air and $$k = \frac{\omega d_2}{c}, H_1(k) = -\cos(kd_2),$$

$$H_{EQ}(k) = \frac{1}{2[\cos(kd_2\cos\theta_0)_1 - \cos(kd_2)]}.$$

* * * * *